United States Patent Office 2,814,652
Patented Nov. 26, 1957

2,814,652

PROCESS FOR THE PREPARATION OF TRI-ISOPROPYL-BENZENE

Ralph Landau, Roslyn Heights, N. Y., assignor, by mesne assignments, to Mid-Century Corporation, Chicago, Ill., a corporation of Delaware No Drawing. Application June 26, 1956, Serial No. 593,798

8 Claims. (Cl. 260—671)

This invention relates to a process for the preparation of high purity 1,3,5-tri-isopropylbenzene from benzene and propylene, and more particularly to a process wherein about 2.5 to 3.5 mols of propylene are reacted with 1 mol of benzene in the presence of an acid reacting Friedel-Craft type alkylation catalyst, such as aluminum chloride, to produce a reaction mixture containing substantially all or a major proportion of the desired tri-isopropylbenzene, together with mono-isopropylbenzene, di-isopropylbenzene, and possibly tetra- or higher -isopropylbenzenes, and separating the desired isopropylbenzene therefrom. This application is a continuation-in-part of my earlier application Serial No. 427,863, filed May 5, 1954, now abandoned.

Tri-isopropylbenzene is a commercially desirable material, e. g., as a solvent or as an ingredient of motor fuel. Tri-isopropylbenzene is especially desirable as an intermediate for the preparation of other chemicals, such as the corresponding tricarboxyl benzenes (by conversion of each iso group to the corresponding carboxyl group), or to the corresponding tri-phenol (by conversion of each isopropyl group to the corresponding hydroxyl group by conversion to the corresponding hydro peroxide and then cleavage in an acid medium). The art is confronted with the problem of providing tri-isopropylbenzenes and especially the 1,3,5-isomer in a convenient and economic manner from readily available raw materials.

The reaction of benzene with propylene in the presence of an acid reacting catalyst, such as aluminum chloride or other Friedel-Craft type catalyst, is known to give mixtures of the various possible alkylation derivatives, many of which are difficult to separate by ordinary means.

The solution of the above-mentioned problem, the discoveries associated with the present invention, and the objects achieved in accordance with the invention as described herein, include the following: the reaction of benzene with propylene in the presence of aluminum chloride or other acid reacting Friedel-Crafts type alkylation catalyst, using about 2.5 to 3.5 mols of propylene per mol of benzene, giving a reaction product containing a major proportion of 1,3,5-tri-isopropylbenzene, separation of the latter by efficient fractionation and recycling the other components thereof to the alkylation step, the desired 1,3,5-tri-isopropylbenzene being substantially the only product removed from the system, and in the preferred operation using approximately 3 mols of propylene per mol of benzene; and other objects which will be apparent as details or embodiments of the invention are set forth hereinafter.

In order to facilitate a clear understanding of the invention, the following preferred specific embodiments are described in detail.

Into a suitable reactor having a corrosion resistant inner surface (e. g., glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

82.5 parts by weight of aluminum chloride
1650 parts benzene (C. P. or thiophene free)
82.5 parts of anhydrous HCl (added gradually); then
2575 parts propylene (e. g. as 95% propylene gas)

is absorbed therein over a period of about 5.5 hours, with agitation, while the temperature is maintained in the range of about 70 to 100° C., e. g., about 75° C. This temperature may be maintained either by passing cooling water through the indirect heat exchange means or by permitting the mixture to boil and refluxing condensate therefrom if the temperature tends to go too high, or passing steam through these means if the temperature tends to go too low.

The reaction mass is then cooled. The reaction mixture is separated into a catalyst complex (lower phase) and a hydrocarbon phase; and the separated hydrocarbon phase is washed with an about equal volume 10% aqueous caustic solution, followed by a washing with an equal volume of water. The resulting washed hydrocarbon phase is distilled using an efficient column (e. g., a 4 foot high by 1.5" diameter column packed with small glass helices for a small scale). The major product of the distillation (98% of the charge) is 1,3,5-tri-isopropylbenzene (boiling point 232–3° C. at atmospheric pressure).

The remainder of the hydrocarbon fractionation may be recycled to the alkylation reaction.

The process of the invention may be conducted continuously, and this method is especially desirable for commercial operation. The reactor may be charged continuously with the recycled catalyst phase plus the make-up aluminum chloride as required, and also additional HCl as required. Benzene and propylene are charged continuously thereto, in the required proportions, and a part of the reaction mixture is continuously removed from the reactor, settled into the lower catalyst layer which is recycled to the reactor, and the upper hydrocarbon layer which is passed through a series of scrubbers or washers, preferably in a counter current manner, first with the aqueous caustic and then with the water. The scrubbed hydrocarbon is passed to a fractionating system, wherein light ends are taken off and recycled, preferably after drying. The main distillate is the desired product, 1,3,5-tri-isopropylbenzene. The bottoms from the fractionating system may be recycled to the reactor (if desired, these bottoms may be flash distilled before recycling to remove tars).

The invention is associated with the surprising discovery that the mixture from the reactor may contain up to approximately 99% by weight of 1,3,5-tri-isopropylbenzene. This maximum is closely approached or obtained for practical purposes if the ratio of propylene (including equivalent isopropyl groups attached to the benzene ring in any recycled material) to total benzene is in the range of about 2.8 to about 3.2, on a mol basis. A somewhat wider range is operative however, e. g., down to about 2.4 mols or up to about 3.5 mols higher of propylene per mol of benzene. Higher ratios might be added, but it appears unlikely from experience that much more than 3 mols of propylene are absorbed per mol of benzene. If less than about 2.4 mols of propylene are used per mol of benzene, the process may be uneconomical in view of the large amount of materials to be distilled and recycled. Of course, it is desirable to avoid excessive ratios of propylene or other conditions which might form a tetra- or higher isomer.

Readily available propylene stocks may be used, preferably free of other unsaturates. The reactor system may be provided with vents to pass off lower boiling hydrocarbons which do not react therein. A hexane fraction or a cumene fraction, or a di-isopropylbenzene fraction, may be removed as overhead, instead of recycling them to the reactor.

The benzene reactant should be free from other aromatics (except cumene or di-isopropylbenzene) and may contain some paraffins, which may be separated out in the system; desirably it is of low sulfur content, and preferably sulfur free.

Comparable results to the foregoing are obtained with various modifications. The hydrocarbon reaction catalyst may be any Friedel-Craft type acid reacting alkylation catalyst, such as hydrogen fluoride, boron trifluoride, and the like. The reaction temperature may be in the range of −80 to 150° C., preferably 50 to 110° C. for the aluminum chloride catalyst. The reaction time may be in the range of 0.1 to 10 hours, preferably 0.5 to 4 hours. Higher temperatures are generally associated with shorter times, and the catalyst, temperature and time conditions are selected to give the desired conversion at the desired throughput rates. Additional aluminum chloride catalyst may be added as required (e. g., as determined by a spot check alkylation reaction using as catalyst a sample of the sludge being recycled for catalytic activity). The spent catalyst is treated with water containing 15–30% hydrochloric acid, to break the catalyst complex, and the resulting hydrocarbon phase is separated and reused in the system.

A highly desirable feature of the process of the invention is that the propylene and benzene reactants may be converted to the corresponding desired 1,3,5-tri-isopropylbenzene in substantially theoretical yield without obtaining economically undesirable amounts of by-products. From the economic viewpoint, this is highly desirable, inasmuch as the commercial utility of the process is directly related substantially to the desired product 1,3,5-tri-isopropylbenzene.

It is indeed surprising that the process of the invention may be carried out in such a convenient manner, with high conversions to give a substantially theoretical yield of the desired product.

In view of the foregoing discussions, variations and modifications of the invention will be apparent to one skilled in the art, and it is intended to include within the invention all such variations and modifications except as do not come within the scope of the appended claims.

I claim:

1. In a process comprising propylating benzene with a propyl group supplying reactant chosen from the group consisting of propylene and tetra- and higher polypropylated benzenes in the presence of an acid-reacting alkylation catalyst, the step of controlling the molar ratio of propyl groups to benzene in the range of about 2.5 to 3.5 while maintaining the temperature in the range of from about −80 to 150° C. whereby the reaction mixture contains a substantially theoretical yield of tri-isopropylbenzene based on the benzene.

2. A process of claim 1 wherein the residue after separation of the tri-isopropylbenzene is recycled to the alkylation step.

3. A process of claim 1 wherein the catalyst is aluminum chloride.

4. A process of claim 1 wherein the catalyst is boron tri-fluoride.

5. A process of claim 1 wherein the catalyst is hydrogen fluoride.

6. A process of claim 1 wherein 1,3,5-tri-isopropylbenzene is the main product.

7. A process of claim 1 in which the propylation is carried out at a temperature in the range of about 50–110° C.

8. A process of claim 3 wherein the temperature is maintained in the range of from about 70 to 100° C.

References Cited in the file of this patent

UNITED STATES PATENTS

| | | |
|---|---|---|
| 2,039,798 | Ipatieff | May 5, 1936 |
| 2,067,764 | Ipatieff | Jan. 12, 1937 |
| 2,275,312 | Tinker et al. | Mar. 3, 1942 |
| 2,399,662 | Burk et al. | May 7, 1946 |
| 2,477,382 | Lewis | July 26, 1949 |
| 2,545,671 | Passino | Mar. 20, 1951 |